US011130566B2

(12) United States Patent
Mikic et al.

(10) Patent No.: US 11,130,566 B2
(45) Date of Patent: Sep. 28, 2021

(54) VTOL AIRCRAFT USING ROTORS TO SIMULATE RIGID WING AERO DYNAMICS

(71) Applicant: Joby Aviation, Inc., Santa Cruz, CA (US)

(72) Inventors: Gregor Veble Mikic, Santa Cruz, CA (US); JoeBen Bevirt, Santa Cruz, CA (US); Alex Stoll, Santa Cruz, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 218 days.

(21) Appl. No.: 15/802,386

(22) Filed: Nov. 2, 2017

(65) Prior Publication Data

US 2018/0290736 A1   Oct. 11, 2018

Related U.S. Application Data

(60) Provisional application No. 62/416,168, filed on Nov. 2, 2016.

(51) Int. Cl.
*B64C 27/26* (2006.01)
*B64C 27/52* (2006.01)
*B64C 3/10* (2006.01)
*B64C 3/32* (2006.01)
*B64C 27/08* (2006.01)
(Continued)

(52) U.S. Cl.
CPC ............... *B64C 27/26* (2013.01); *B64C 3/10* (2013.01); *B64C 3/32* (2013.01); *B64C 27/08* (2013.01); *B64C 27/22* (2013.01); *B64C 27/52* (2013.01); *B64C 29/0016* (2013.01);
(Continued)

(58) Field of Classification Search
CPC ......... B64C 27/22; B64C 27/24; B64C 27/26; B64C 29/0016; B64C 29/0025; B64C 3/32; B64C 2027/8236; B64C 39/08; B64C 39/06; B64C 39/062; B64C 39/068
See application file for complete search history.

(56) References Cited

U.S. PATENT DOCUMENTS 3,856,238 A * 12/1974 Malvestuto, Jr. ......... B64B 1/00
                                                                  244/5
5,244,167 A    9/1993 Turk et al.
(Continued)

FOREIGN PATENT DOCUMENTS

| DE | 20 2015 007089 U1 | 11/2015 |
|---|---|---|
| WO | WO 2010/137016 A2 | 12/2010 |
| WO | WO 2015/019255 A1 | 2/2015 |

OTHER PUBLICATIONS

PCT Search Report and Written Opinion; dated Jul. 31, 2018; for PCT/US2017/059809.
(Continued)

*Primary Examiner* — Magdalena Topolski
*Assistant Examiner* — Marisa V Conlon
(74) *Attorney, Agent, or Firm* — Michael A. Guth

(57) ABSTRACT

A vertical take-off and landing aircraft which uses fixed rotors for both VTOL and forward flight operations. The rotors form a synthetic wing and are positioned to achieve a high span efficiency. The rotors are positioned to even out the lift across the span of the synthetic wing. The synthetic wing may also have narrow front and rear airfoils which may provide structural support as well as providing lift during forward flight. The wing rotors are tilted forward and provide some forward propulsion during horizontal flight.

20 Claims, 24 Drawing Sheets

(51) Int. Cl.
    *B64C 39/06*     (2006.01)
    *B64C 27/22*     (2006.01)
    *B64C 29/00*     (2006.01)
    *B64C 27/82*     (2006.01)

(52) U.S. Cl.
    CPC ............ *B64C 39/06* (2013.01); *B64C 39/068* (2013.01); *B64C 2027/8236* (2013.01)

(56) References Cited

U.S. PATENT DOCUMENTS

| | | | |
|---|---|---|---|
| 5,374,010 A | 12/1994 | Stone et al. | |
| 6,293,491 B1* | 9/2001 | Wobben | B64C 27/00 244/17.23 |
| 7,159,817 B2* | 1/2007 | VanderMey | B64C 29/0016 244/12.1 |
| 7,410,122 B2* | 8/2008 | Robbins | B64C 39/024 244/12.3 |
| 7,735,774 B2* | 6/2010 | Lugg | B64C 3/10 244/12.3 |
| 8,016,226 B1* | 9/2011 | Wood | B64C 29/0033 244/12.4 |
| 8,485,464 B2* | 7/2013 | Kroo | B64C 3/16 244/17.23 |
| 9,944,386 B1* | 4/2018 | Reichert | B64C 27/20 |
| 10,246,184 B2* | 4/2019 | Ragland | B64C 29/0025 |
| 10,287,011 B2* | 5/2019 | Wolff | B64C 29/0033 |
| 10,364,036 B2* | 7/2019 | Tighe | B64C 29/0025 |
| 10,577,091 B2* | 3/2020 | Parks | B64C 39/08 |
| 2005/0178879 A1 | 8/2005 | Mao | |
| 2012/0091257 A1 | 4/2012 | Wolff et al. | |
| 2015/0266571 A1* | 9/2015 | Bevirt | B64D 27/24 244/7 C |
| 2016/0144957 A1 | 5/2016 | Claridge et al. | |
| 2016/0272312 A1 | 9/2016 | Mallard | |

OTHER PUBLICATIONS

Larry A. Young, Conceptual Design Aspects of Three General Sub-Classes of Multi-Rotor Configurations: Distributed, Modular, and Heterogeneous; Jan. 20-22, 2015, Scottsdale, AZ.

\* cited by examiner

VTOL AIRCRAFT USING ROTORS TO SIMULATE RIGID WING AERO DYNAMICS

CROSS-REFERENCE TO RELATED APPLICATIONS

This application claims priority to U.S. Provisional Patent Application No. 62/416,168 to Mikic et al., filed Nov. 2, 2017, which is hereby incorporated by reference in its entirety.

FIELD OF THE INVENTION

This invention relates to aerial vehicles, an aerial vehicle using rotors to simulate rigid wing aerodynamics.

SUMMARY

Figure 1A:
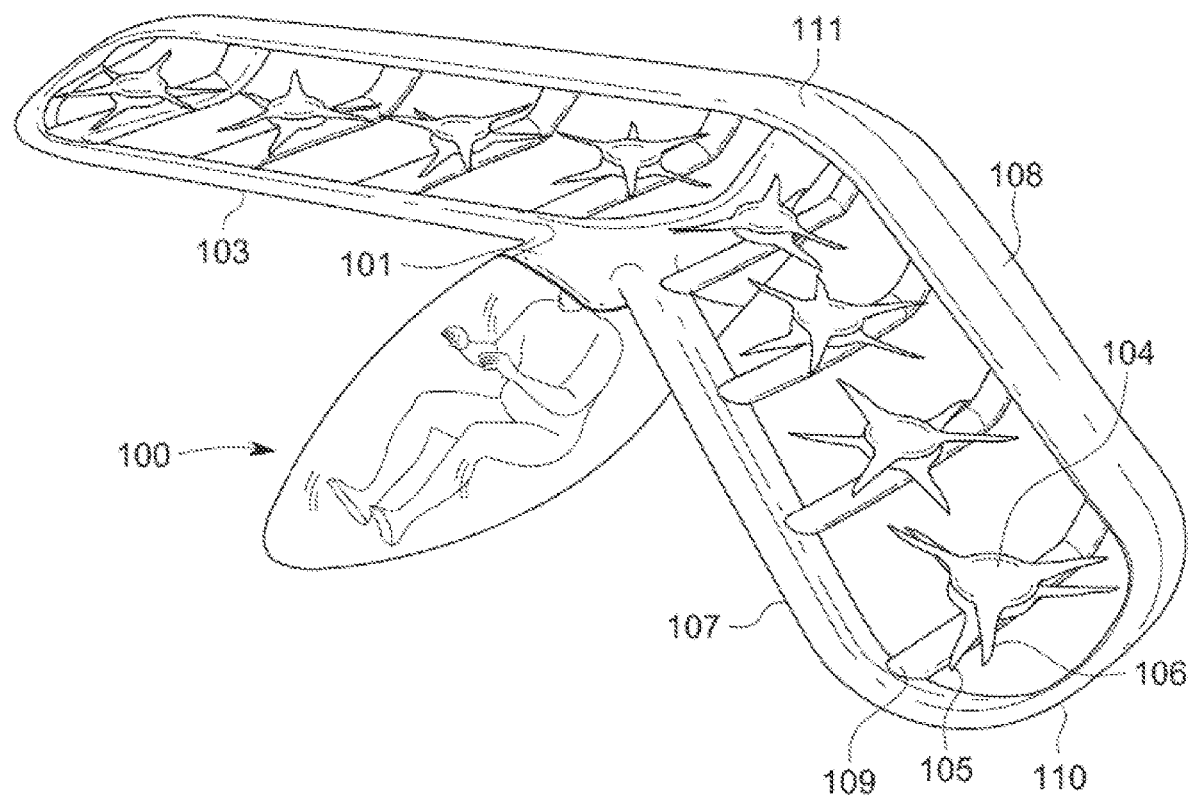
FIGS. 1A-D are shaded renderings of an aerial vehicle with synthetic wings using stacked counter-rotating propellers according to some embodiments of the present invention.
Figure 1B:
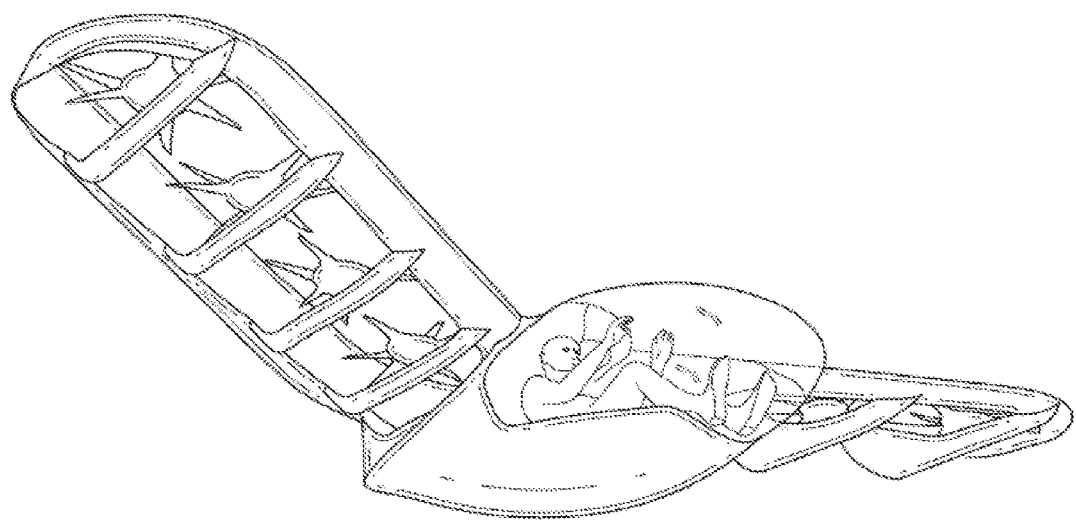
Figure 1C:
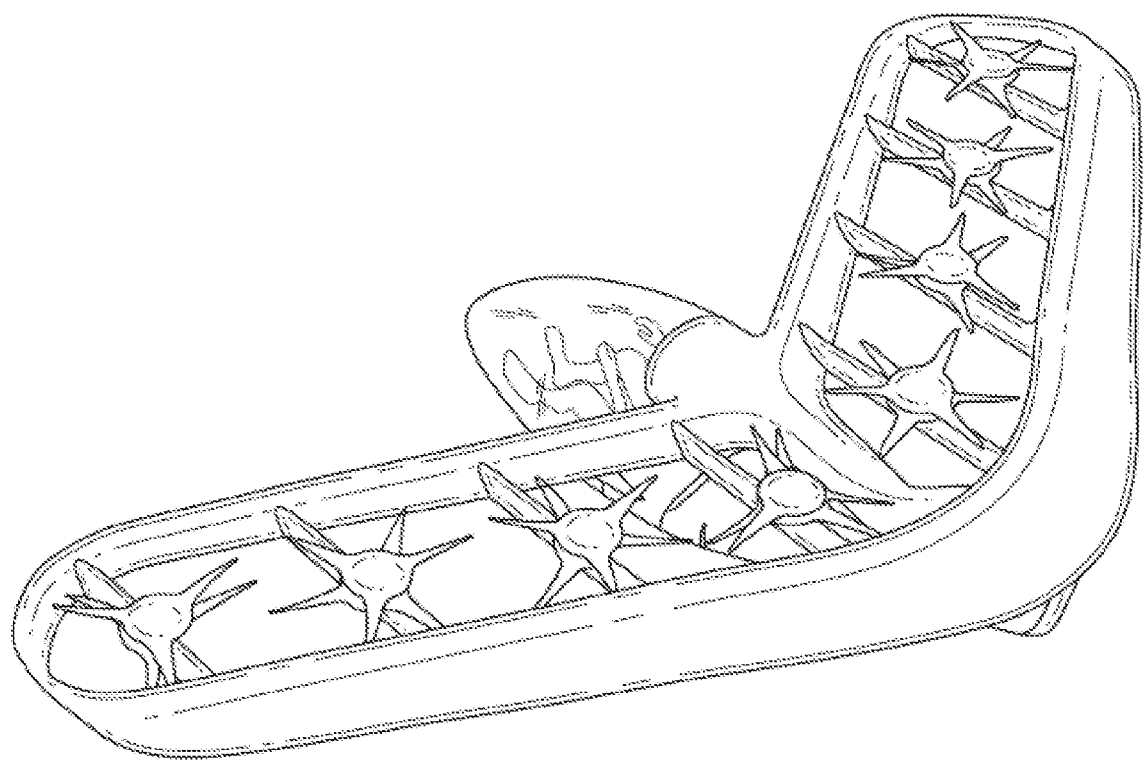
Figure 1D:
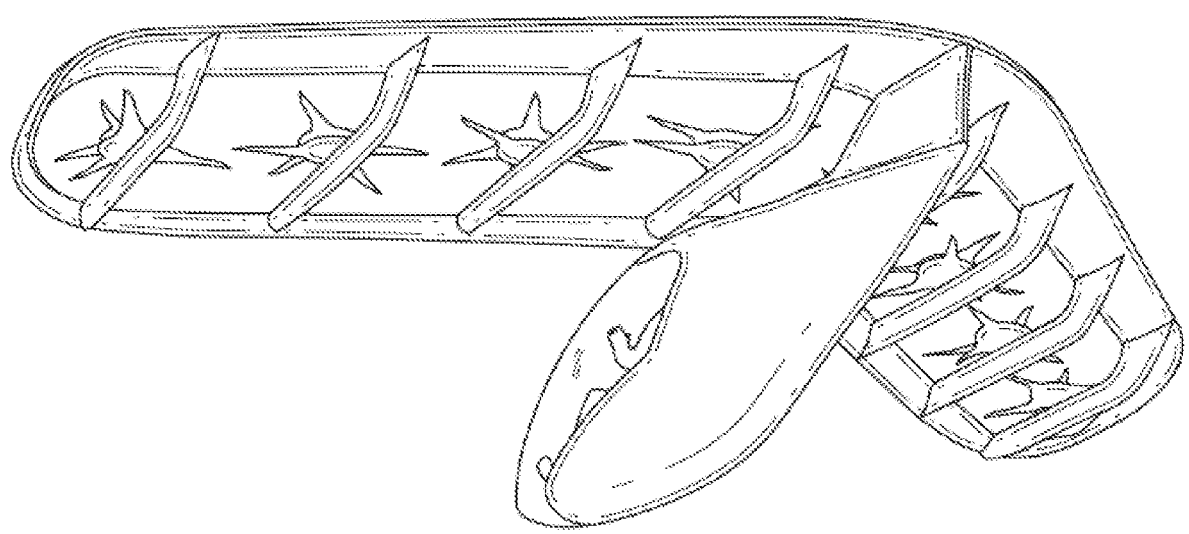
Figure 2A:
FIGS. 2A-D are drawings of an aerial vehicle with synthetic wings using stacked counter-rotating propellers according to some embodiments of the present invention.
Figure 2B:
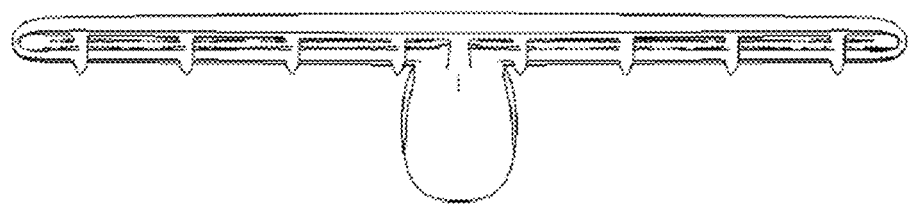
Figure 2C:
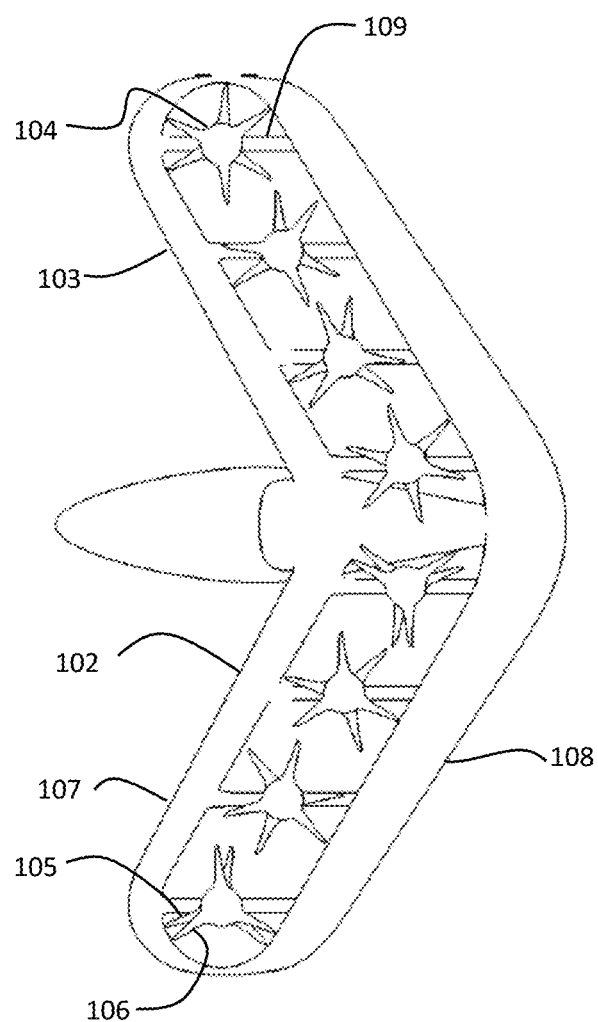
Figure 2D:
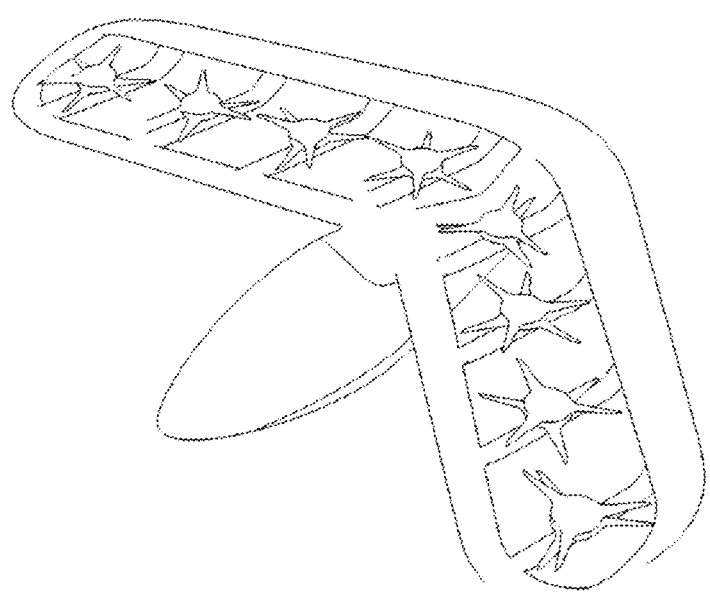

A vertical take-off and landing aircraft which uses fixed rotors for both VTOL and forward flight operations. The rotors form a synthetic wing and are positioned to achieve a high span efficiency. The rotors are positioned to even out the lift across the span of the synthetic wing. The synthetic wing may also have narrow front and rear airfoils which may provide structural support as well as providing lift during forward flight. The wing rotors are tilted forward and provide some forward propulsion during horizontal flight.

DETAILED DESCRIPTION

In some embodiments of the present invention, an aerial vehicle which has an array of rotors configured to perform as a synthetic wing, or pseudo-wing. The rotors are positioned relative to the aerial vehicle body, and to each other, such that the lift of the rotor array has relatively even lift along the span of the pseudo-wing. The synthetic wing produces (relatively) even lift and relatively even trailing vertical velocity (downwash). Shed vorticity is concentrated at the wingtips, similar to a traditional airfoil wing.

In some embodiments, the rotors are fixedly mounted to structures coupled to the aerial vehicle main body. The rotors may be staggered along the longitudinal axis of the aerial vehicle such that differential thrusting along the longitudinal axis allows for forward pitch of vehicle in order to provide a forward thrust component from the rotors. Pitch control may also be achieved using other means, such as elevator control. In some embodiments, the rotors may have some articulable aspects.

In some embodiments, the rotor arrays which make up the synthetic wing may have a short chord forward wing forward of the rotors. As the aerial vehicle uses the rotors for vertical thrust during take-off, the aerial vehicle does not need significant lift from traditional wings during take-off operations. A forward wing of short chord length allows for lift during forward flight, during higher airspeed operation. The aerial vehicle may also have a short rear wing rearward of the rotors. The rearward wing, with a short chord length, may provide lift during higher speed forward flight operations. The rearward wing may also further even out the downwash of the pseudo-wing. The forward wing and rearward wing may be used as structural elements which support struts that support the rotors. The forward wing and the rearward wing may join at the outboard ends, which may allow for increased strength and stability. Additionally, the forward wing and the rearward wing, which are in place around the outside (in the horizontal plane) of the arrays of rotors, provide an element of safety for users and ground personnel, as a shield around the spinning blades of the rotors.

In some embodiments, there may only be a trailing wing. In some embodiments, there may only be a leading edge wing. In some embodiments there are both a leading wing and a trailing wing.

In some embodiments, one or more rotors are used to provide forward thrust. In some aspects, a single pusher rotor may be used at the rear of the aerial vehicle. In some embodiments, the rotation axis of the wing rotors may be tilted relative to vertical. In some embodiments, the wing rotors may be tilted forward. The forward tilted wing rotors contribute towards the forward thrust of the aerial vehicle during forward flight. In some embodiments, the total forward thrust during forward flight is derived from a combination of the forward tilted wing rotors and one or more traditional rotors with their spin axis parallel to the roll axis of the aerial vehicle.

The aerial vehicle may be constructed such that lift is provided by both the wings and the wing rotors in forward flight, and the forward propulsion is provided by a tail propeller and the forward tilted wing rotors.

The efficiency of the aircraft (lift/drag ratio) during forward flight may be sought to be as high as feasible while balancing other aircraft parameters. For example, the ratio of the tip speed of the spinning wing rotors during forward flight to velocity of the aircraft during forward flight is an important ratio to consider when designing for efficiency. Also, the percentage of lift provided by the wing rotors relative to the total lift (wings plus wing rotors) is an important ratio to consider when designing for efficiency. Also, the ratio of the power distribution between the wing rotors and the total power delivered to both the wing rotors and the traditional forward thrust propellers (a tail rotor, for example) is an important ratio to consider when designing for efficiency. The interplay between these ratios may be complex and does not lend itself to obvious optimization. An underlying design parameter is that the wing rotors provide sufficient vertical thrust during vertical take-off and landing to safely take-off and land the aircraft.

Aerial vehicles according to embodiments of the present invention are adapted for vertical take-off and landing using the wing rotors. For take-off the wing-rotors are spun up to a speed in the range of their hover rpm. In embodiments wherein the wing rotors have their spin axis tilted forward relative to the horizontal axis of the aerial vehicle, the aerial vehicle will be pitched up during take-off and landing such that the plane of the wing rotors is horizontal. After take-off the aerial vehicle may spin up a forward pushing (or pulling) propeller, such as a tail rotor, while the wing rotors are still under power. As the aerial vehicle gains forward speed, lift is generated by the leading wings and the trailing wings, and the proportion of lift provided by the wing rotors decreases. As the aircraft approaches its cruise velocity, the wing rotors typically have their rpms reduced, but they stay under power and provide a portion of the total lift of the aerial vehicle.

An aerial vehicle according to embodiments of the present invention will be able to engage in hover, take-off, landing, and forward flight including all required maneuvering and attitude adjustments by manipulating the speeds of individual rotors, and without the need for any further control surfaces. In some embodiments, the aerial vehicle will not have ailerons, or elevators, or any other controllable control surfaces. In some embodiments, the wing rotors for each wing are arranged along a linear line, or along a curving line, with each rotor further out from the aircraft body. The wing rotors may also be in a forward or rearward swept configuration such that the rotors are at different stations along the roll axis of the aircraft. With the differential stations along the roll axis, the wing rotors are then able to provide control around the pitch axis. With spacing at distances further out from the aircraft body, the wing rotors are able to provide control around the roll axis.

In some embodiments, as seen in FIGS. 1A-D in shaded renderings and in FIGS. 2A-D in line drawings, an aerial vehicle 100 has a main body 101 coupled to a right synthetic wing 102 and a left synthetic wing 103, using stacked counter-rotating propellers. In this exemplary embodiment, with a short chord leading wing 107 and a short chord trailing wing 108, a plurality of rotor assemblies 104 are located along a span length. The rotor assemblies 104 are mounted on span supports 109 which are coupled to the leading wing 107 and the trailing wing 108. A wing tip section 110 joins the leading wing 107 to the trailing wing 108.

The rotor assemblies 104 may have a first propeller 105 and a second propeller 106. In some aspects, the first propeller 105 and the second propeller 106 spin in opposite directions. In such a configuration, the leading edge of one propeller goes forward on the outboard side of the spin axis of the rotor, and the leading edge of the other propeller goes forward on the inboard side of the spin axis of the propeller. In a forward flight mode, a propeller blade will have a higher thrust as it is coming forward into the prevailing airspeed wind than it will when retreating relative to the prevailing airspeed wind. With counter rotating coaxial propellers, the downward thrust inboard and outboard of the rotor axis is evened out.

In an exemplary embodiment, an aerial vehicle may accommodate one passenger and have a take off mass of 315 kg. The span of the wings may be 6 m, and the length of the vehicle may be 3.5 m, with a height of 1.5 meters. The pseudo wings may each be of 4 coaxial rotor assemblies, each with a pair of counter-rotating propellers. Each propeller has 3 blades, with a blade chord at 75% radius of 0.05 m. The aerial vehicle has a short chord front wing with a chord of 0.5 m mean, and a short chord rear wing with a chord of 0.75 m mean. The idealized cruise speed is 100 knots with a top cruise speed of 150 knots. The power consumption in ideal cruise is 20 kW, and the power consumption in hover mode is 80 kW. The battery mass is 50 kg and the range of the vehicle is 50 miles.

An aspect of the synthetic wing is that the rotors are configured to provide relatively even thrust along span of the synthetic wing. One approach is as discussed above, with counter-rotating propellers on rotor assemblies places adjacent to each other along the span of the pseudo-wing. Another approach, which does not use coaxial counter-rotating propellers, is to have propellers which have overlapping retreating and forward going blade areas. For example, a rotor may be placed with a forward moving blade on the outboard side, retreating on the inboard side. Just inboard from this rotor may be another rotor with its forward moving blade on the outboard side. The rotors may be spaced vertically to allow this overlap. In some aspects, the rotors may be spaced along the longitudinal axis to allow this overlap.

Figure 3:
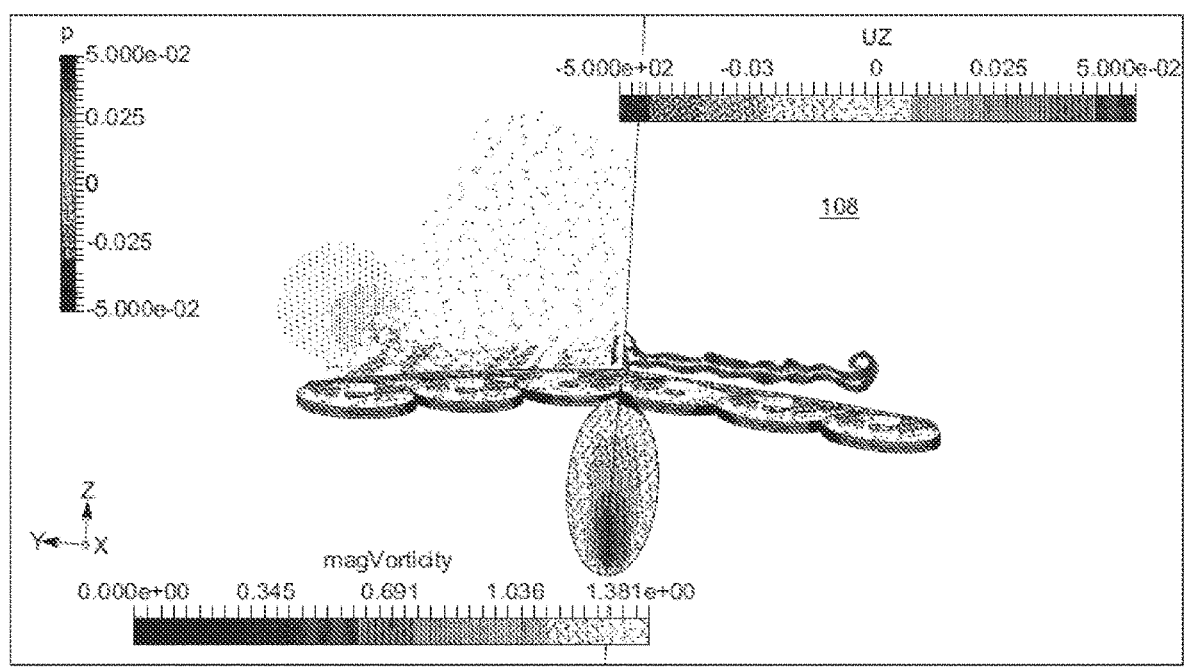
FIG. 3 is a solution plot of an aerial vehicle in forward flight according to some embodiments of the present invention.

FIG. 3 illustrates functional aspects of a synthetic wing, using as an exemplary embodiment an aerial vehicle with three counter rotating rotor assemblies on each side of the vehicle main body. The left hand side of the figure illustrates the vertical velocity behind the wing, and the right hand side of the figure represents the magnitude of vorticity. A goal of the design of the synthetic wing is the reduced variation of the lift across the span of the synthetic wing. The reduced variation of the lift along the span of the wing may become apparent by modeling for the vertical velocity behind the wing. The left hand side of the figure illustrates relatively steady amount of vertical velocity along the span, demonstrating that the synthetic wing using three counter-rotating rotor assemblies functions, in the aerodynamic sense, as a regular wing constructed using a solid airfoil shape.

The right hand side of the figure illustrates the magnitude of vorticity along the span of the wing and at its tip. The evenness of the vertical velocity along the span, as discussed above, should, as a first approximation, indicate commensurate evenness of the magnitude of vorticity. When using rotors arrayed into a synthetic wing there is a real possibility of introducing spots of high vorticity along the span. The location of the rotors is very important to minimize the magnitude of shed vorticity along the span.

Although the results seen in FIG. 3 represent output for a modeled synthetic wing, it is understood that there is certain amount of time dependent variation in the outputs related to the variation in blade position in time.

Figure 4A:
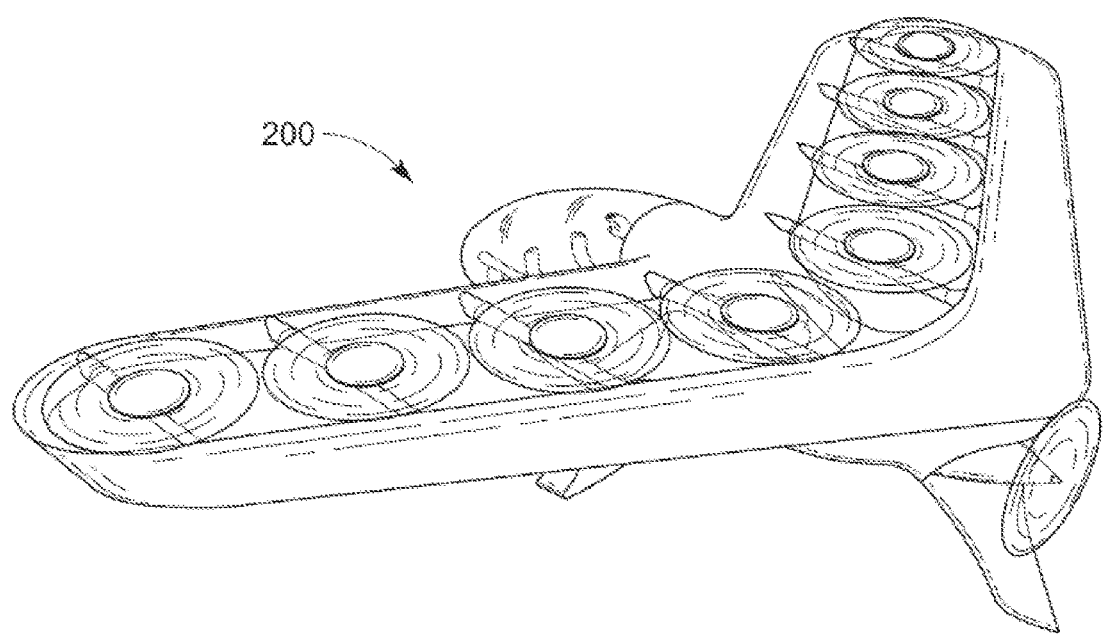
FIGS. 4A-B are shaded renderings of an aerial vehicle with synthetic wings according to some embodiments of the present invention.
Figure 4B:
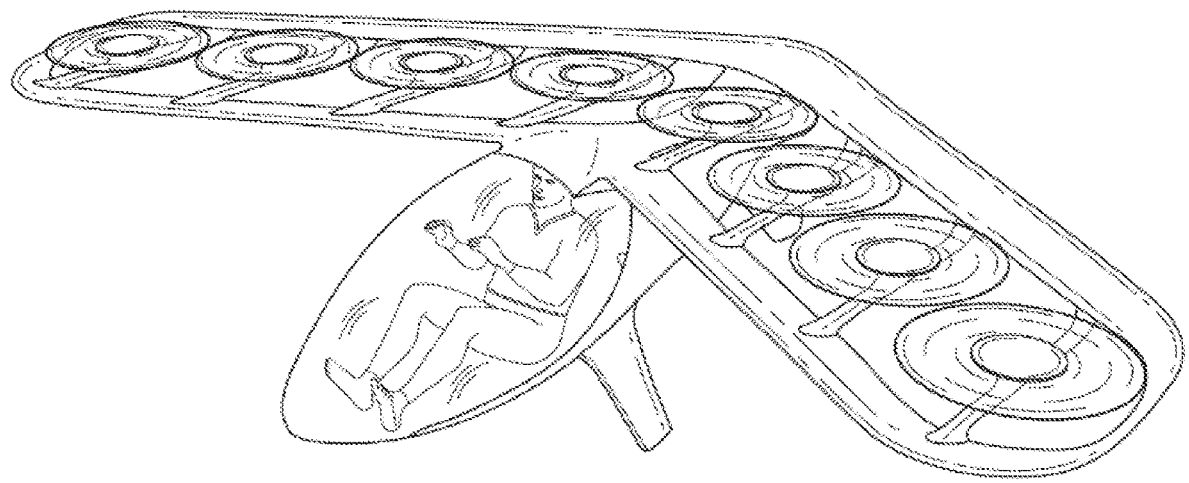
Figure 5A:
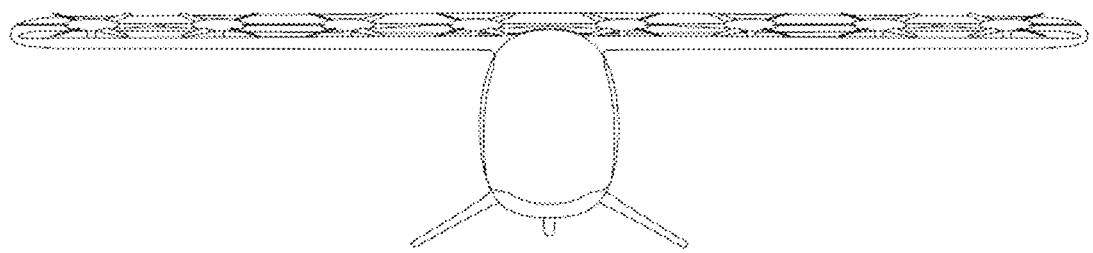
FIGS. 5A-C are drawings of an aerial vehicle with synthetic wings according to some embodiments of the present invention.
Figure 5B:
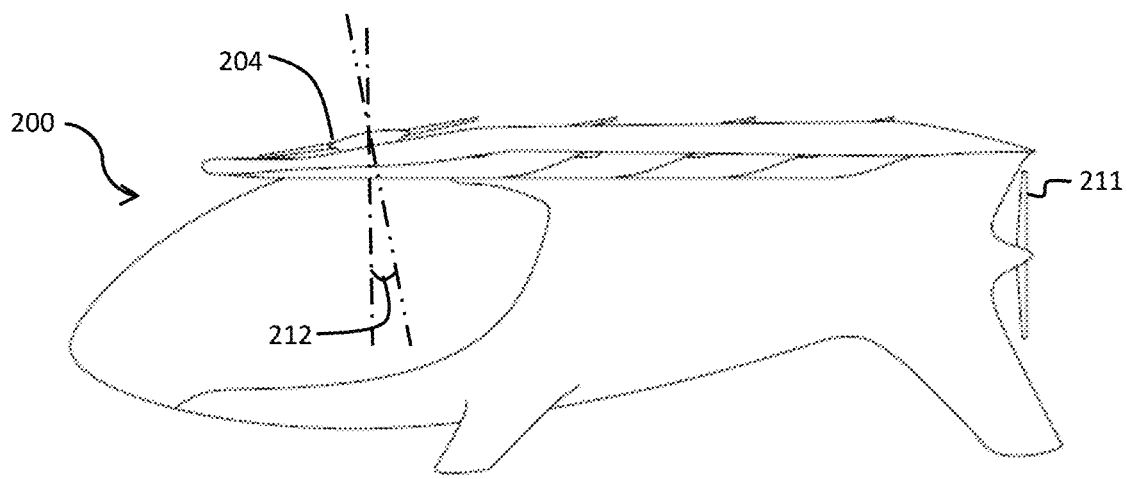
Figure 5C:
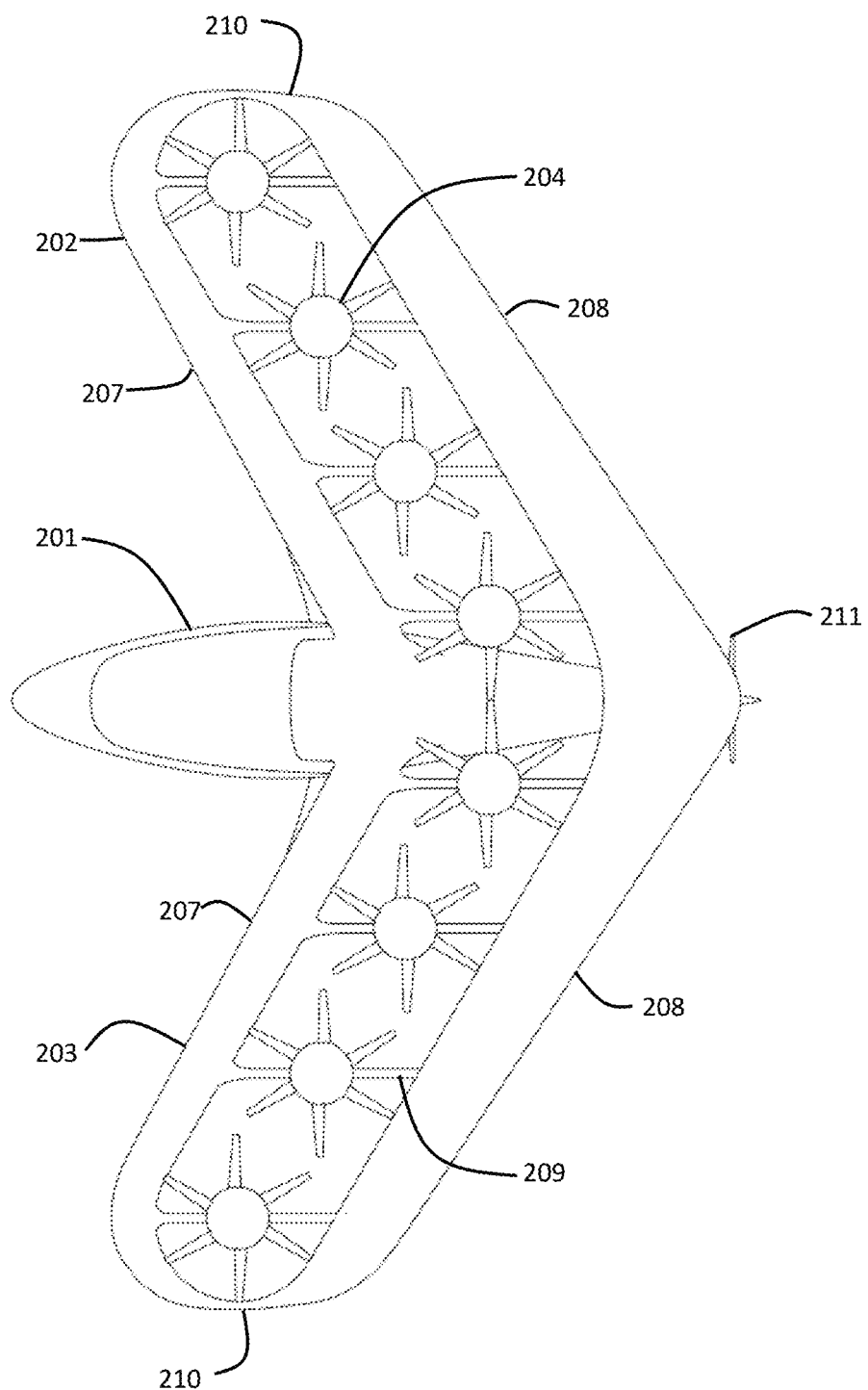

In some embodiments, as seen in FIGS. 4A-B in shaded renderings and in FIGS. 5A-C in line drawings, an aerial vehicle 200 has a main body 201 coupled to a right synthetic wing 202 and a left synthetic wing 203, using wing mounted rotors. In this exemplary embodiment, with a short chord leading wing 207 and a short chord trailing wing 208, a plurality of wing rotor assemblies 204 are located along a span length. The wing rotor assemblies 204 are mounted on span supports 209 which are coupled to the leading wing 207 and the trailing wing 208. A wing tip section 210 joins the leading wing 207 to the trailing wing 208. The aerial vehicle 200 does not use counter-rotating, stacked, rotor assemblies. Although stacked assemblies may have distinct advantages with regard to load distribution, in some embodiments wherein the lift percentage delivered by the rotors during horizontal flight is lower, efficient flight may be achieved with single rotors, such as with the aerial vehicle 200. Further, single rotors allow for reduced cost and complexity.

In some aspects, the wing rotor assemblies 204 are not vertical relative to the constant altitude cruise plane of the aircraft, but are tilted forward at an angle 212. In some aspects, the rotors are tilted forward in the range of 5-20 degrees. In some aspects, the rotors are tilted forward in the range of 5-15 degrees. In some aspects, the rotors are tilted forward in the range of 8-20 degrees. In some aspects, the rotors are tilted forward in the range of 8-12 degrees. In an exemplary embodiment, the rotors are tilted at 10 degrees. The tilt angle may be defined as the angle between the rotor axis and the mean aerodynamic chord line of the largest wing, which may be the trailing wing in some embodiments.

The aerial vehicle 200 has a horizontal thrusting rear rotor assembly 211 adapted to provide horizontal thrust during regular flight. Size and configuration details of an exemplary embodiment of the aerial vehicle 200 are seen in Table 1. Figures A-B illustrate a rotor 204 with its central hub 221, which may include an electric motor, and the blades 220.

In some aspects, the wing rotor assemblies 204 have rotating propellers with electric motors. In some aspects, the horizontal thrusting rear rotor assembly 211 has an electric motor. In some aspects, the motors are powered by an electric power source, such as a battery or plurality of batteries.

TABLE 1

| General dimensions | |
|---|---|
| Maximum take off mass [kg] | 500 |
| Number of occupants | 1 |
| Payload [kg] | 100 |
| Battery mass [kg] | 150 |
| Wing span [m] | 5.8 |
| Length [m] | 3.6 |
| Height [m] | 1.5 |
| Total wing area [m^2] | 4.2 |
| Front wing mean chord [m] | 0.25 |
| Rear wing mean chord [m] | 0.375 |
| Wing sweep [deg] | −30 |
| Performance | |
| Cruise speed [kts] | 100 |
| Total cruise power [kW] | 32 |
| Lift/Effective drag | 8 |
| Range [nm] | 50 |
| Rotors | |
| Number of synthetic wing rotors | 8 |
| Number of blades per rotor | 6 |
| Rotor diameter [m] | 0.8 |
| Disk loading [kg/m^2] | 124 |
| Inner rotor radius [m] | 0.15 |
| Blade root chord [cm] | 6 |
| Blate tip chord [cm] | 3 |
| Blade root pitch [deg] | 13 |
| Blade tip pitch [deg] | 10 |
| Installed tilt angle in cruise [deg] | 10 |
| Tail propeller diameter[m] | 0.6 |
| Electric motor for rotors | |
| Peak power [kW] | 50 |
| Continuous power [kW] | 25 |
| Power in hover (sea level) [kW] | 20 |
| Power in cruise [kW] | 2 |
| Power in cruise (total rotors) [kW] | 16 |
| Cruise RPM | 1200 |
| Hover RPM | 3400 |

TABLE 1-continued

| Electric motor for propeller | |
|---|---|
| Continuous power [kW] | 20 |
| Cruise RPM | 1200 |
| Power in Cruise [kW] | 16 |

The use of wing rotor assemblies which are tilted forward allows for forward propulsion to be provided in part by the wing rotor assemblies and in part by the regular, horizontal thrusting, propeller. A factor to be considered in the sharing of this forward propulsion is the fraction of the total power delivered to the wing rotors relative to the total power delivered to both the wing rotors and the regular propeller during forward cruise flight.

Another factor to be considered is the fraction of lift carried by the wing rotors relative to the total lift provided by both the wing(s) and wing rotors during forward flight. In an embodiment wherein all attitude control, including roll control, is induced or maintained by manipulation of wing rotor motor speeds, the fraction of lift provided by the wing rotors must be high enough to allow the manipulation of the wing rotors to be effective in controlling the aircraft attitude. In some aspects, the fraction of the lift provided by the wing rotors at cruise speed is greater than 0.2. In some aspects, the fraction of the lift provided by the wing rotors is greater than 0.25. In some aspects, the fraction of the lift provided by the wing rotors is greater than 0.3.

Another factor to be considered is the ratio of the tip speed of the wing rotors relative to the velocity of the aircraft during forward flight. This factor may come into play as one or more wing rotors is lowered in speed to reduce lift on one of the wings to effect roll. In such a maneuver, the wing rotors on the other wing may be spun up to increase lift. A risk of stall occurs on the retreating rotor blades when run nominally at a low multiple of aircraft velocity. In some aspects, the nominal cruise wing rotor tip velocity is greater than 2.0 times the aircraft cruise speed. In some aspects, the nominal cruise wing rotor tip velocity is greater than 2.5 times the aircraft cruise speed.

The factors discussed above have been modeled to determine the lift to drag ratio L/De (effective drag) for the aerial vehicle 200 as a function of the tip speed of the wing versus the aircraft forward speed against the angle of attack of the aircraft, and this data has been graphically represented. The lift to drag ratio can be seen as color coding signifying the lift to drag ratio. The lift to drag ratio (effective drag) is the combined shaft power of the aircraft divided by the aircraft forward velocity. Laid over this color coding are contour lines signifying the other factors discussed above; the fraction of total power delivered to the wing rotors, the fraction of lift carried by the wing rotors, and also the aircraft velocity. The lift to drag ratio is modeled at different forward tilt angles for the wing rotors, and also with different wing rotor blade pitches. By bracketing in the portion of the graph between the cruise speed range of the aircraft 200 (50-75 m/s), and by reviewing the area with a wing rotor tip speed to aircraft speed ratio over 2.0, it has been discovered that a non-obvious range of parameters give operational modes with the highest lift to drag ratio. A preferred outcome is to have the lift to drag ratio above 8 within constraint values discussed above, with higher ratios of 9 or 10 even more desirable.

Figure 6A:
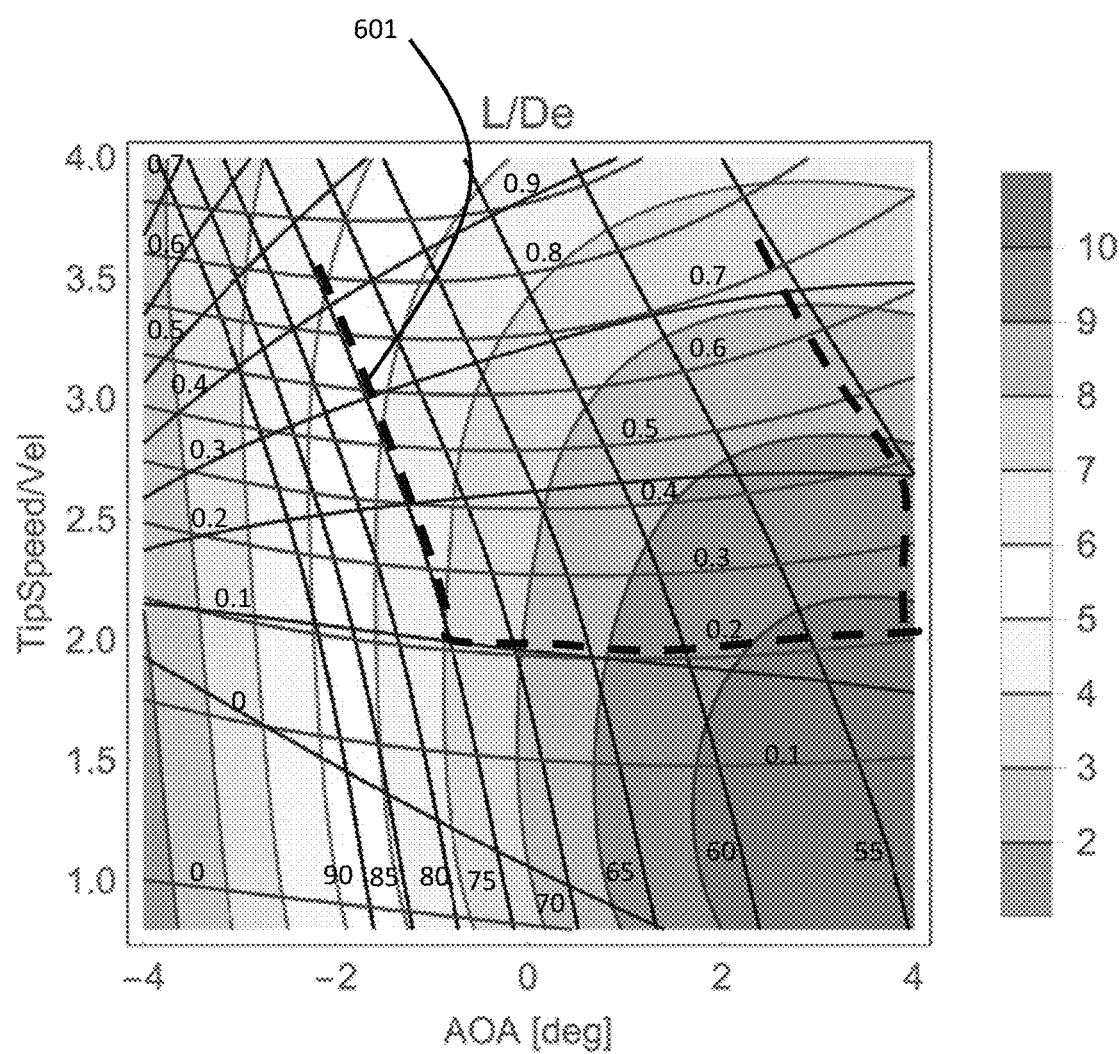
FIGS. 6A-G are lift drag curves for a variety of parameter values.

FIGS. 6A-G are CFD results weighing the parameters discussed above for differing versions of an aerial vehicle. FIG. 6A illustrates the results for the aerial vehicle 200 discussed above. The outline 601 forms a bound around an area bounded by the cruise speeds 50 m/s and 75 m/s, and above the rotor tip speed vs. aircraft speed ratio above 2.0. As seen, there are significant areas of L/De which are above 8, including significant areas above 9, and some above 10. This signifies that this vehicle, with 10 degree forward tilted wing mounted rotors, can achieve these L/De ratios over a variety of operating scenarios.

Figure 6B:
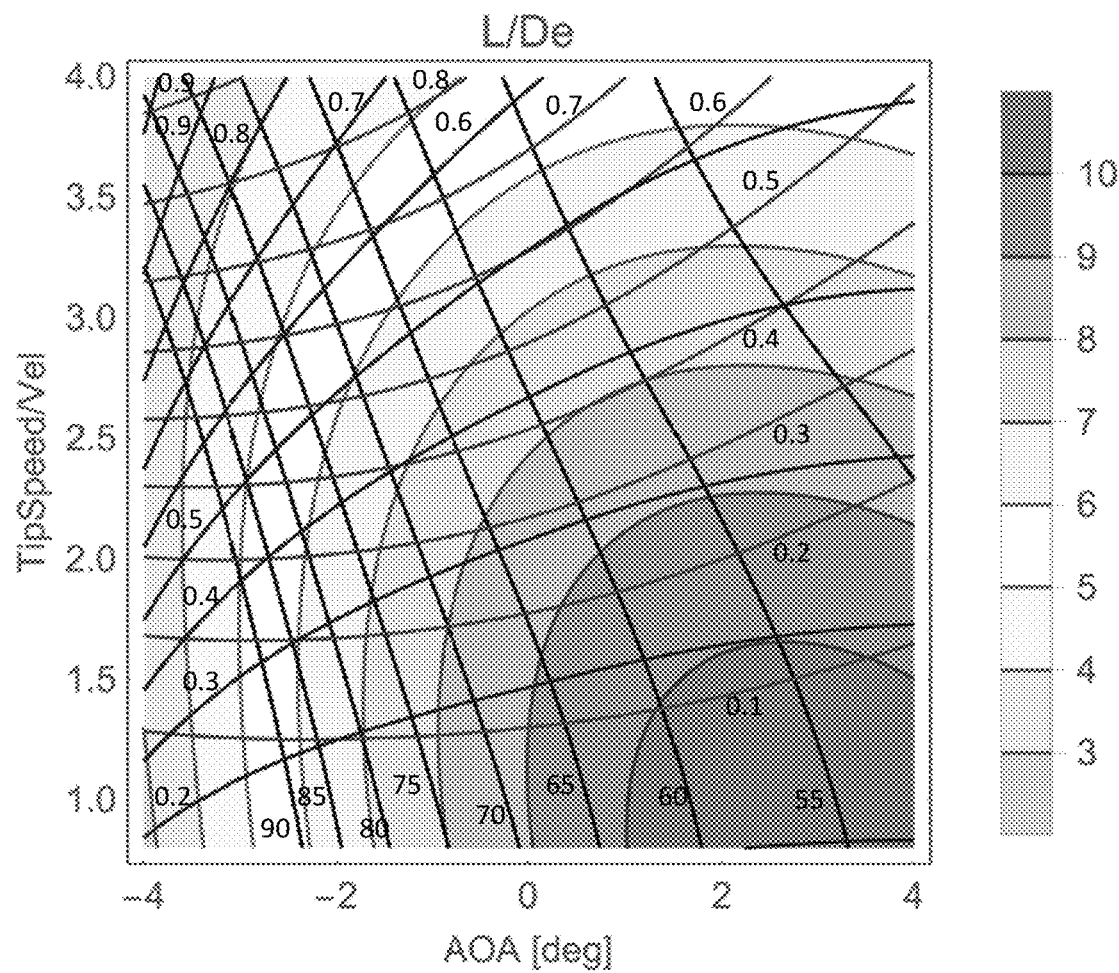

FIG. 6B illustrates a similar vehicle with the rotors at 0 degrees of forward tilt. As seen, there are almost no areas of L/De of as high as 9 above the 2.0 speed ratio line.

Figure 6C:
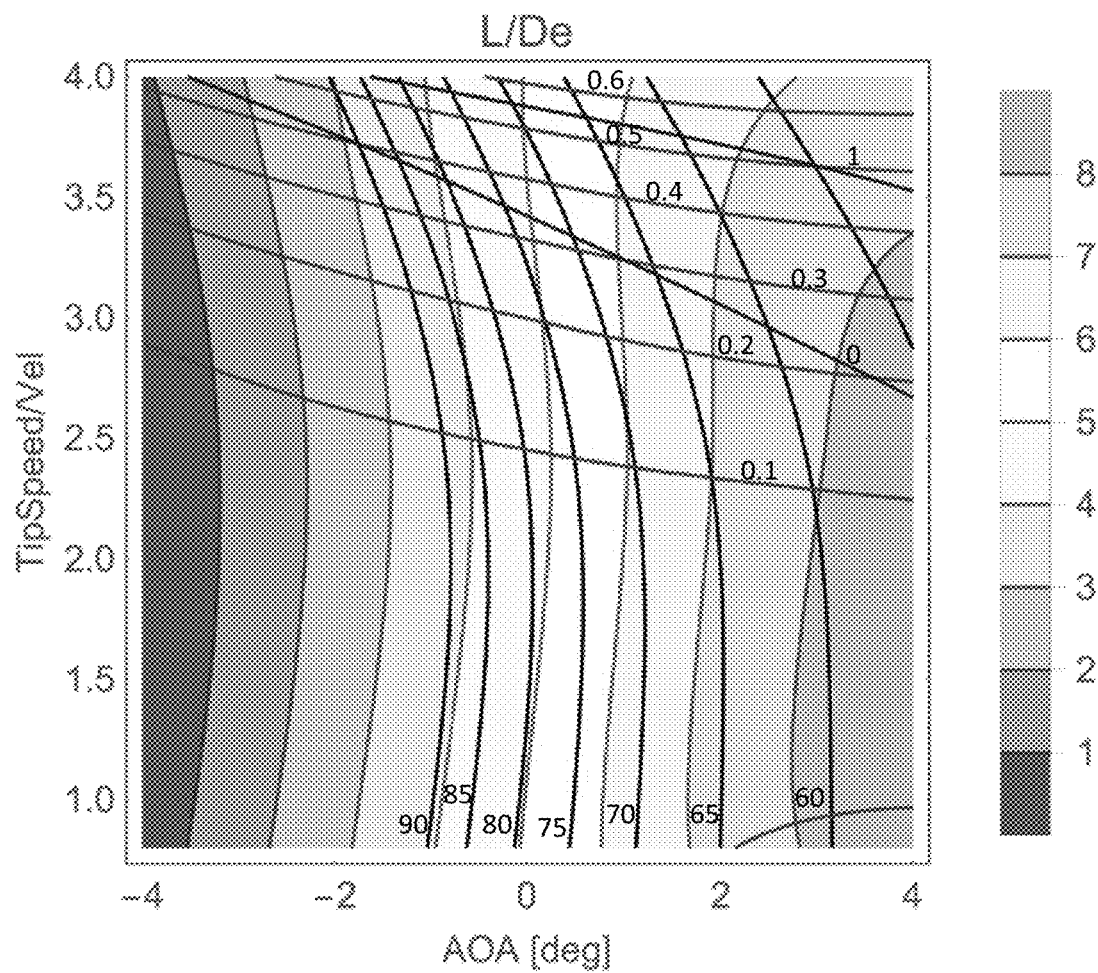

FIG. 6C illustrates a similar vehicle with the rotors at 20 degrees of tilt. As seen, there are no areas of L/De higher than 8 available to operate within.

Figure 6D:
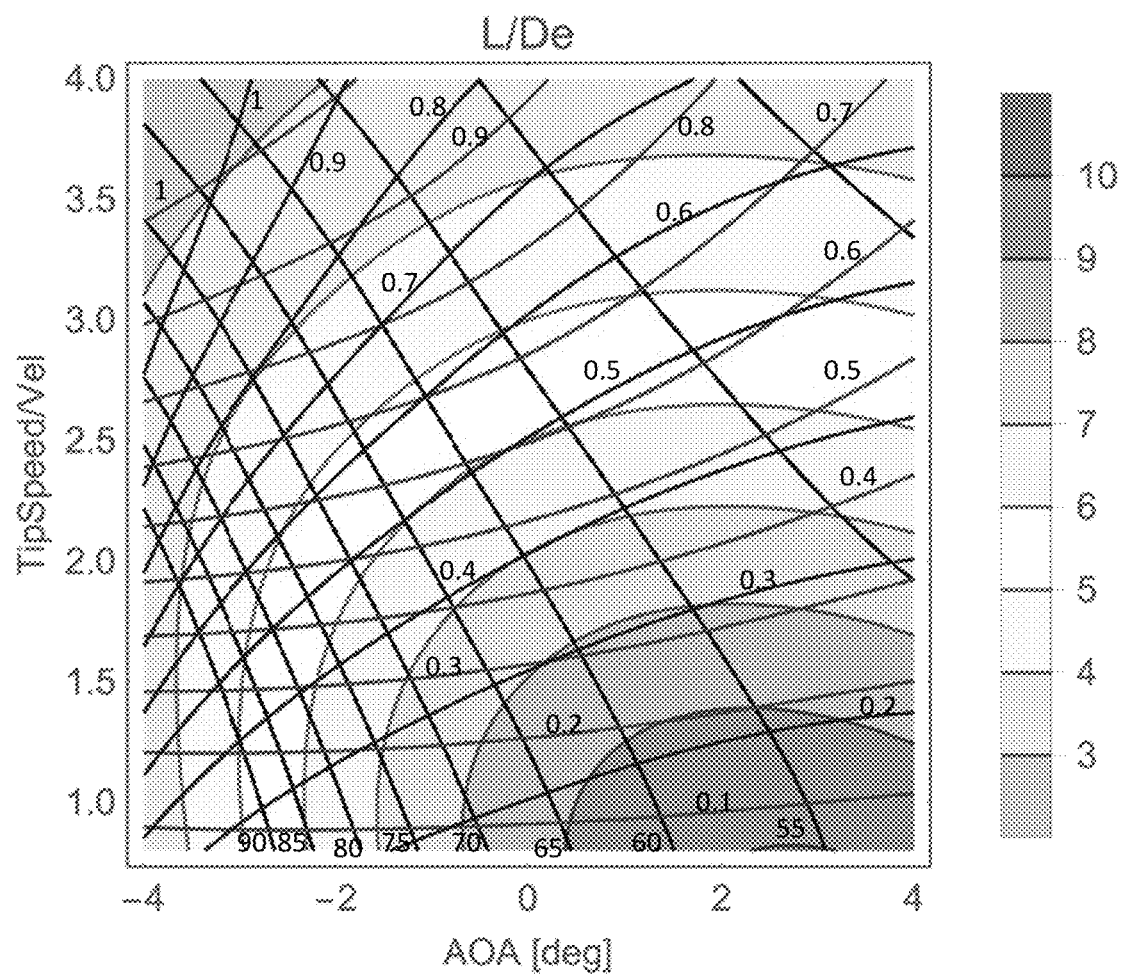

FIG. 6D illustrates a similar vehicle with the rotors at 0 degrees of forward tilt but with rotor blades with 5 degrees more pitch than the case of FIG. 6B. As seen, there are almost no areas of L/De of as high as 8 above the 2.0 speed ratio line.

Figure 6E:
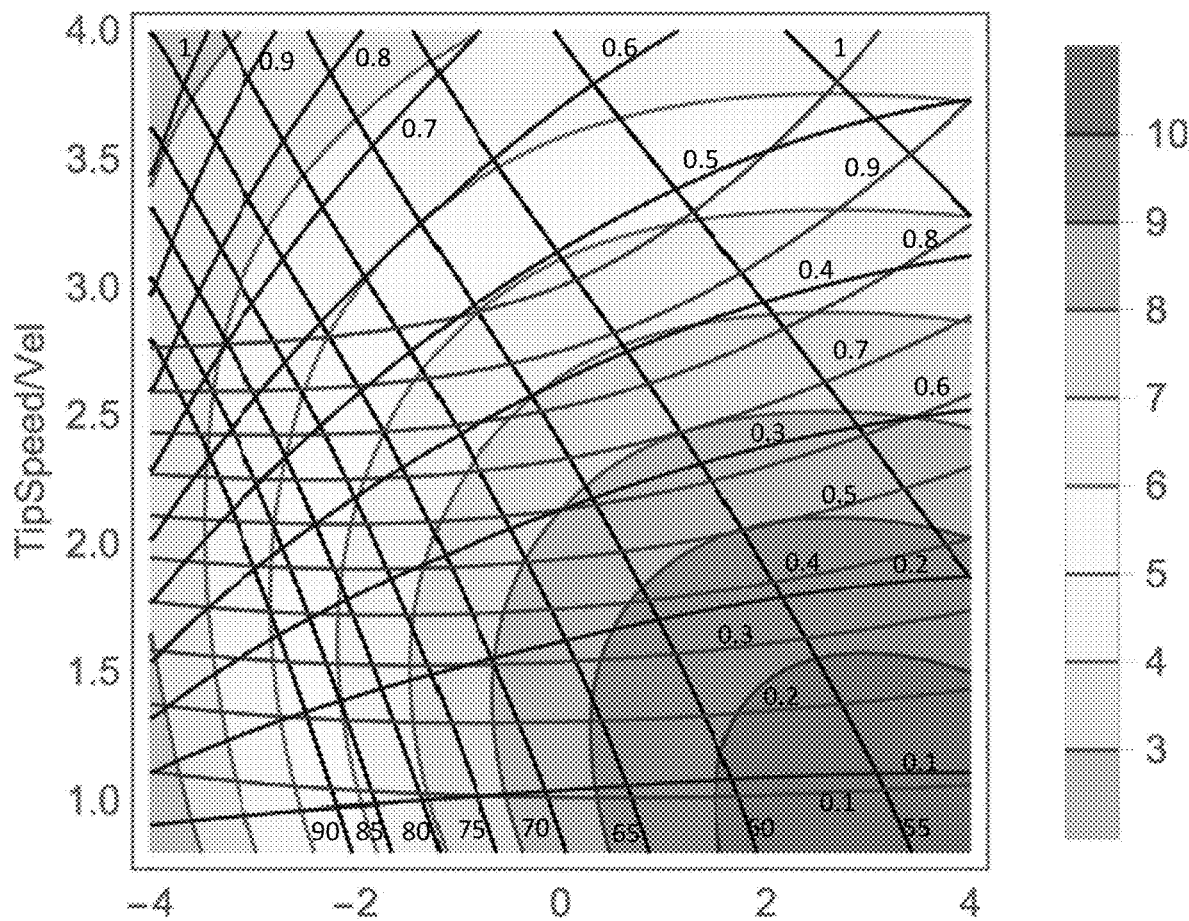

FIG. 6E illustrates a similar vehicle with the rotors at 10 degrees of forward tilt but with rotor blades with 5 degrees more pitch than the case of FIG. 6A. As seen, there are almost no areas of L/De of as high as 8 above the 2.0 speed ratio line, although relative to the other cases with 5 degrees more pitch in the rotor blades this appears to be optimal.

Figure 6F:
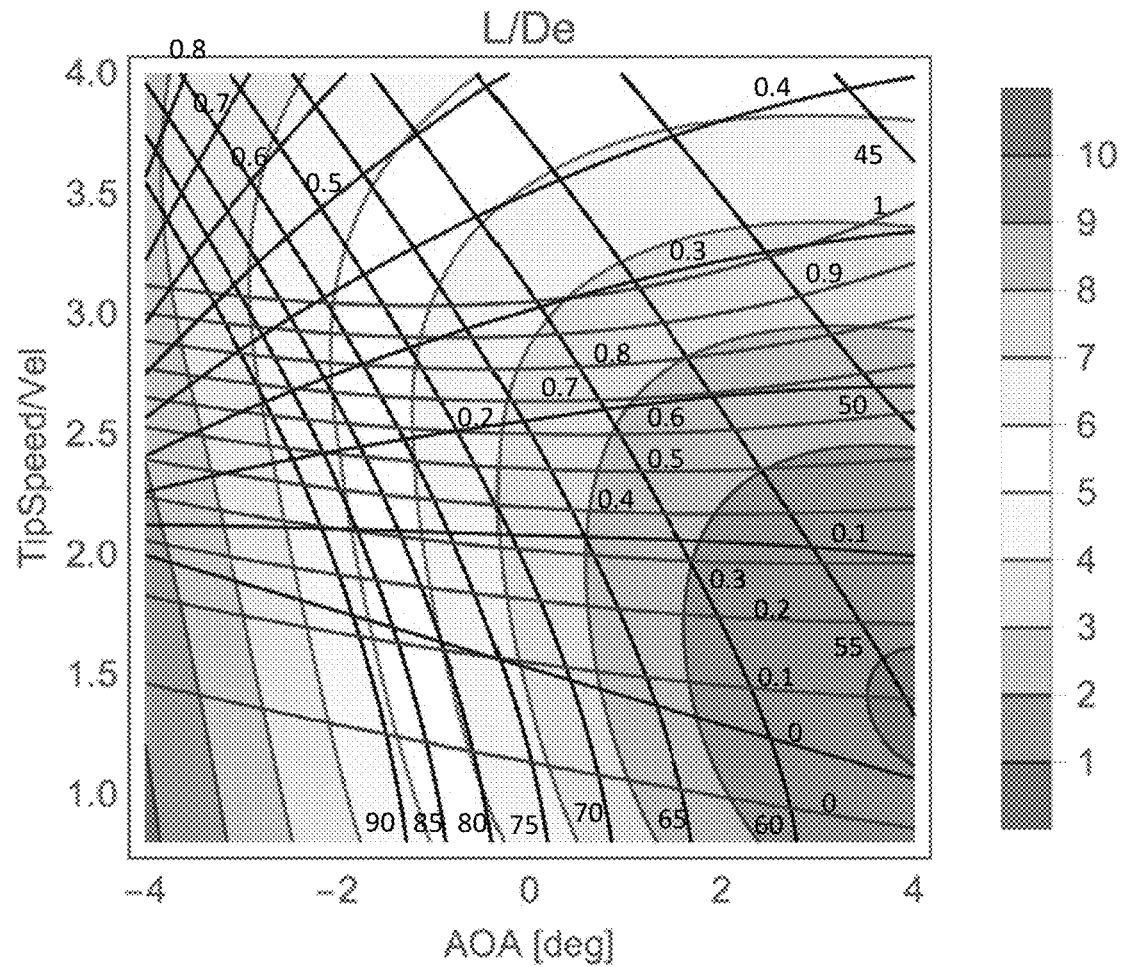
Figure 6G:
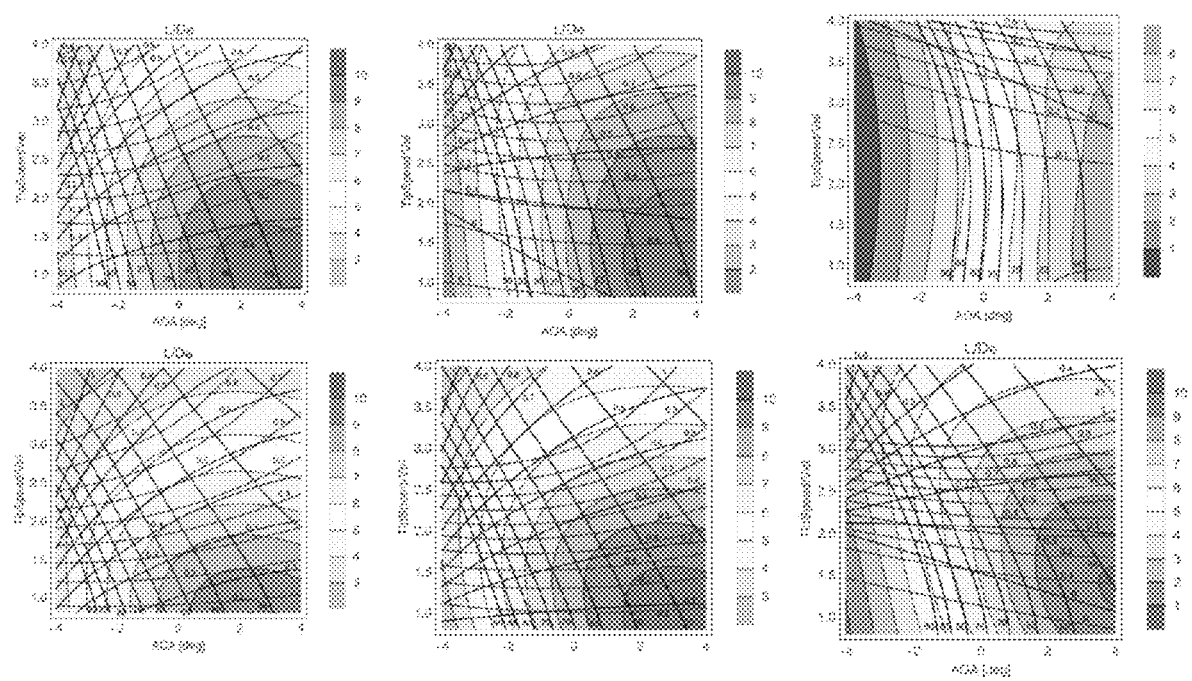

FIG. 6F illustrates a similar vehicle with the rotors at 20 degrees of forward tilt but with rotor blades with 5 degrees more pitch than the case of FIG. 6C. As seen, there are almost no areas of L/De of as high as 9 above the 2.0 speed ratio line, especially in the areas of level flight (0 degrees AOA).

Figure 7:
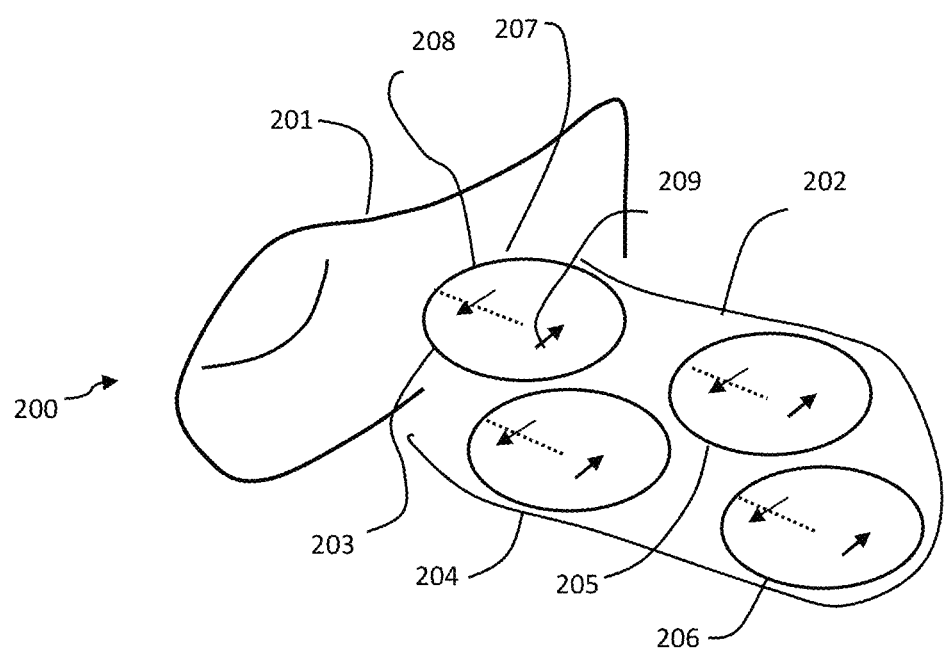
FIG. 7 is a view of an aerial vehicle with a synthetic wing using longitudinally staggered rotors according to some embodiments of the present invention.

In some embodiments of the present invention, as seen in FIG. 7, an aerial vehicle 200 with a left side synthetic wing 202 (right side synthetic wing not shown) has rotors staggered along the longitudinal axis. The inboard rotor 207 has a forward direction side of its propeller 208 and a returning side 209. The returning side 209 of the inboard rotor 207 significantly overlaps, along the span direction of the pseudo-wing 202, with the forward direction side of the next rotor 204. This is repeated with the succeeding rotors 205, 206. This significant overlap of adjacent rotors forward direction side and returning sides evens out the lift provided during forward flight, as the forward flight speed enhances the lift on forward travel portion of the propellers rotation.

Figure 8:
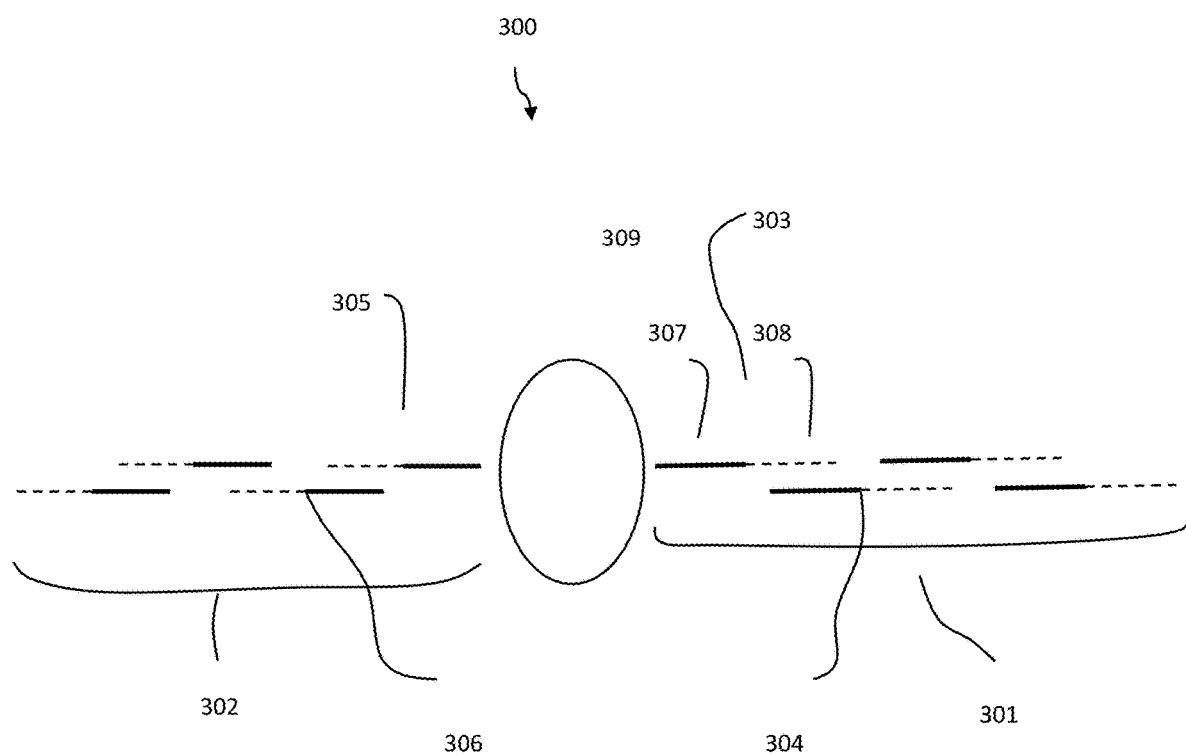
FIG. 8 is a view of an aerial vehicle with a synthetic wing using vertically staggered rotors according to some embodiments of the present invention.

In some embodiments of the present invention, as seen in FIG. 8, an aerial vehicle 300 with a left side synthetic wing 301 and a right side synthetic wing 302 has rotors staggered vertically along the span of the synthetic wing. The inboard rotor 303 has a forward direction side of its propeller 307 and a returning side 308. The returning side 308 of the inboard rotor 303 significantly overlaps, along the span direction of the synthetic wing 301, with the forward direction side of the next rotor 304. This is repeated with the succeeding rotors. This significant overlap of adjacent rotors forward direction side and returning sides evens out the lift provided during forward flight, as the forward flight speed enhances the lift on forward travel portion of the propellers rotation.

Figure 9A:
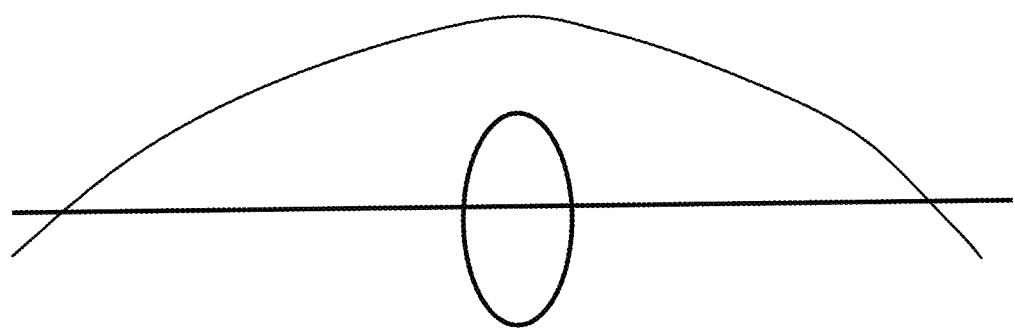
FIGS. 9A-E are sketches illustrating the evenness of lift for different vehicle configurations.

FIGS. 9A-E illustrate span-wise lift distribution for traditional and synthetic wings. FIG. 9A illustrates an hypothetical even span-wise lift distribution, as would be seen with a traditional wing. FIGS. 6B-E illustrate the lift distribution profiles of various types of synthetic wings, with each lift distribution profile contrasted against an elliptical ideal lift distribution (seen in dashed line). A rotor array configuration with a more even span-wise lift distribution will give a lower ratio of induced drag relative to an ideally loaded solid airfoil wing. An aspect of using a larger number of smaller rotors, as opposed to fewer larger rotors, is that there is less total blade area for a given length of span, and less drag. Generally, mean blade chord does not change with the number of rotors for a given total lift and tip speeds, so smaller rotors have a more favorable aspect ratio (radius to mean chord ratio).

Figure 9B:
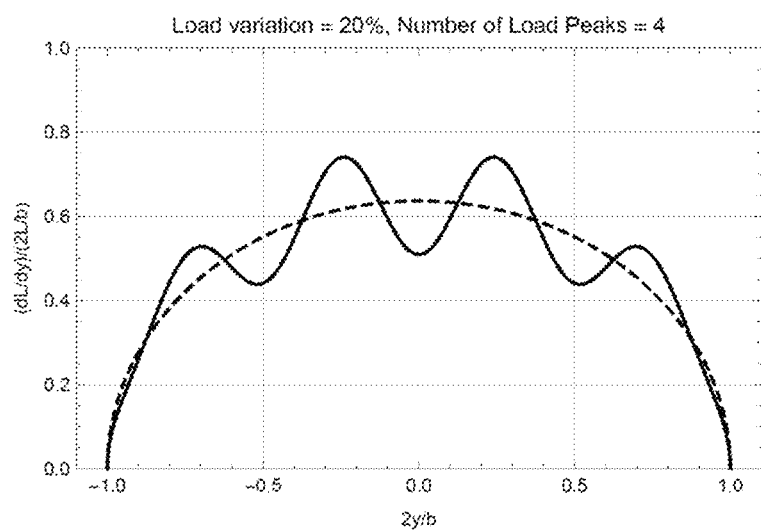
Figure 9C:
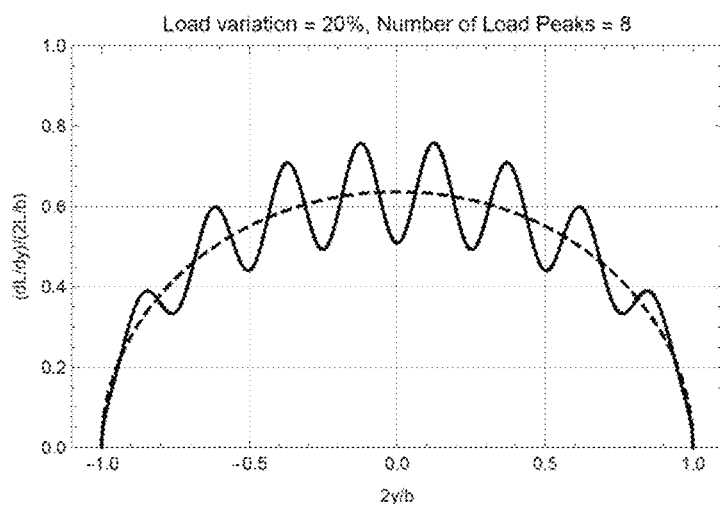

FIG. 9B illustrates a 4 rotor system (2 rotors per synthetic wing). The load variation is 20% due to the rotor configuration. The ratio of induced drag of this configuration to that of an ideally loaded wing is 1.22. FIG. 9C illustrates an 8 rotor system (4 rotors per synthetic wing). The load variation is 20% due to the rotor configuration. The ratio of induced drag of this configuration to that of an ideally loaded wing is 1.43.

Figure 9D:
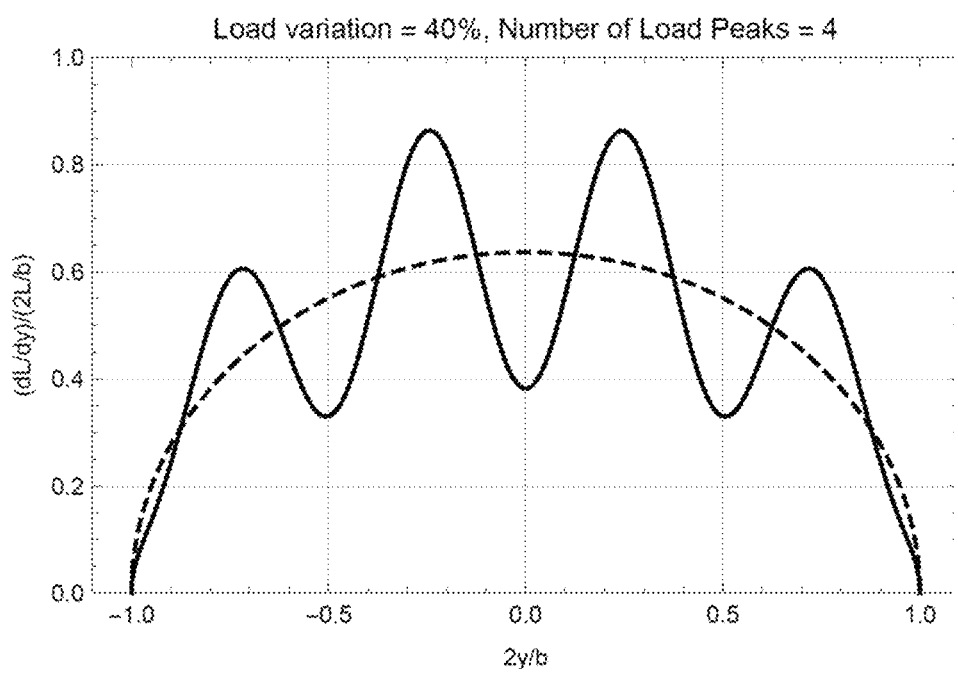
Figure 9E:
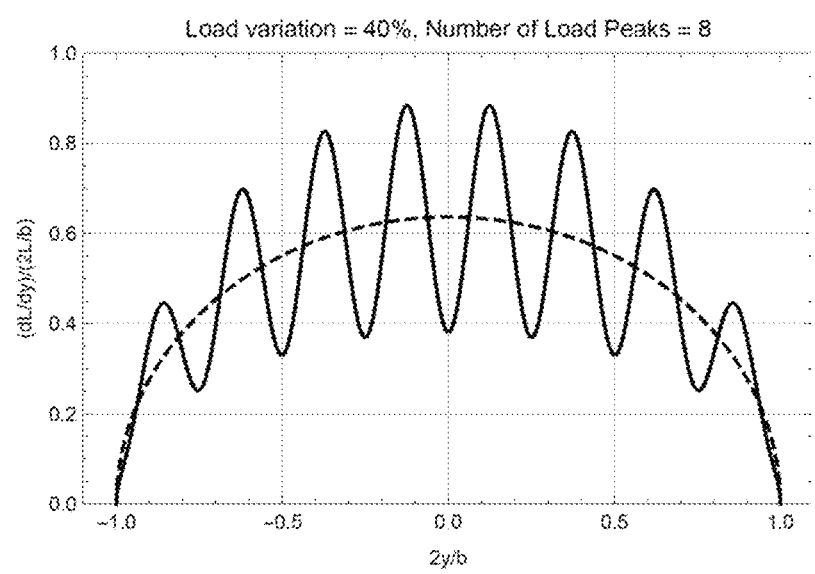

FIG. 9D illustrates a 4 rotor system (2 rotors per synthetic wing). The load variation is 40% due to the rotor configuration. The ratio of induced drag of this configuration to that of an ideally loaded wing is 1.88. FIG. 9E illustrates an 8 rotor system (4 rotors per synthetic wing). The load variation is 40% due to the rotor configuration. The ratio of induced drag of this configuration to that of an ideally loaded wing is 2.71.

Figure 10A:
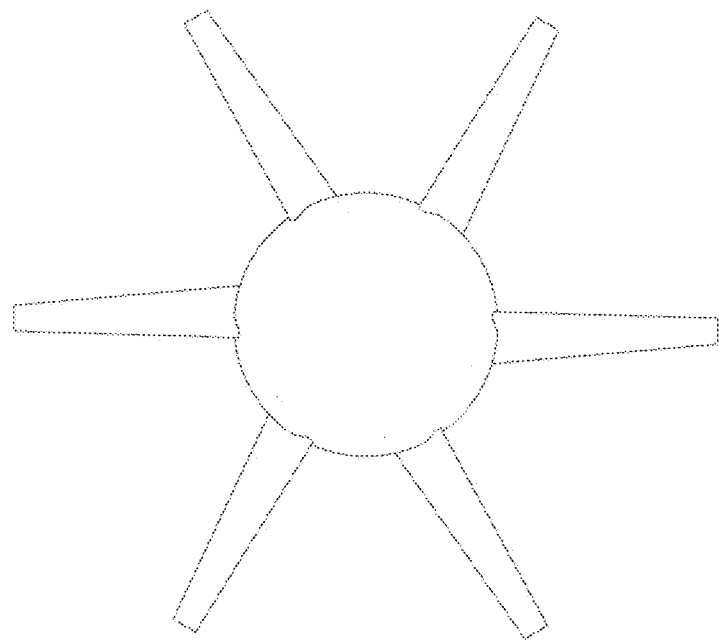
FIGS. 10A-B are views of a rotor according to some embodiments of the present invention.
Figure 10B:
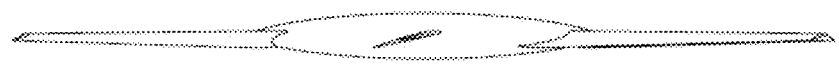

FIG. 10 illustrates a rotor according to some embodiments of the present invention. As seen, there is significant radius at the inboard end of the rotor blades (as dimensioned in Tables 1 and 2). In such a configuration, the inboard end of the rotor blade is less susceptible to have its retreating blade stall as compared to a configuration where the blade routes further towards the spin axis. This center area of the rotor allows for placement of the individual motor (or pair of motors in the counter-rotating blade configuration). Thus, the rotor blades may begin radially outboard (relative to the spin axis) of the motor itself.

Figure 11A:
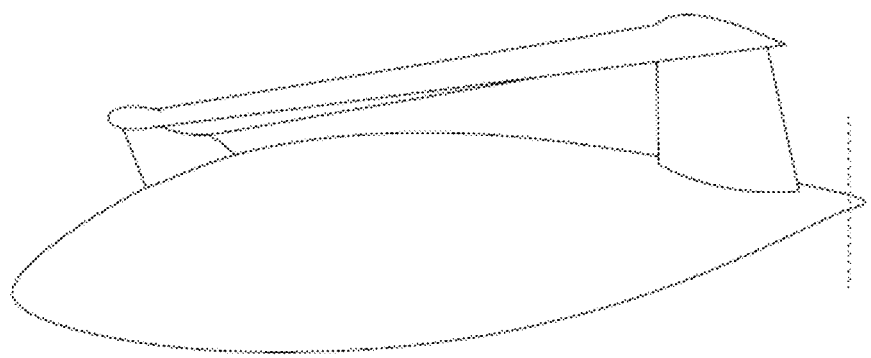
FIGS. 11A-C are views of an aerial vehicle according to some embodiments of the present invention.
Figure 11B:
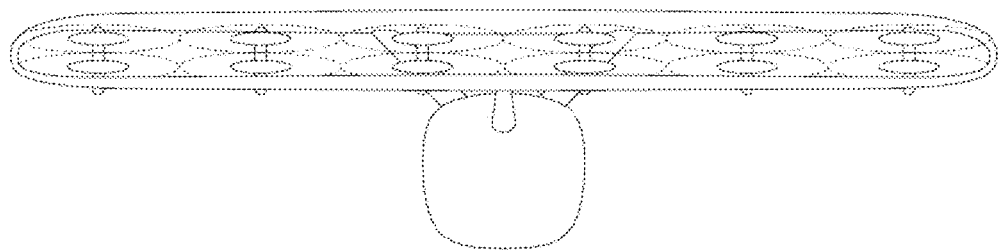
Figure 11C:
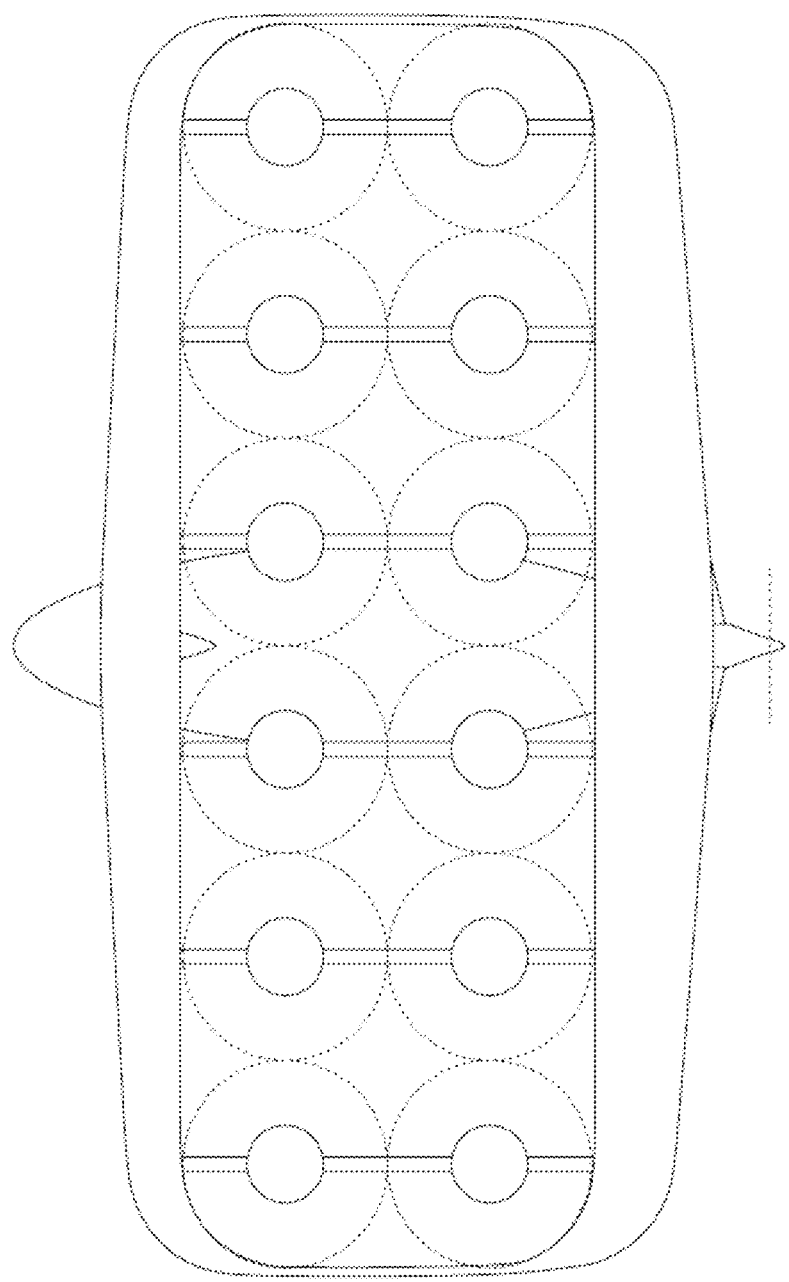

In some embodiments, as seen in FIGS. 11A-C, an aerial vehicle 300 may have a dual set of forward tilted rotors forming a right side pseudo-wing 302 and a left side pseudo-wing 303. Leading edge wings and trailing wings also provide lift during forward flight. The aerial vehicle main body 301 supports a forward thrusting tail rotor 311. Details and dimensions of an exemplary embodiment are seen in Table 2.

TABLE 2

| General dimensions | |
|---|---|
| Maximum take off mass [kg] | 2000 |
| Number of occupants | 4 |
| Payload [kg] | 400 |
| Battery mass [kg] | 600 |
| Wing span [m] | 9.7 |
| Length [m] | 6 |
| Height [m] | 3.8 |
| Total wing area [m^2] | 12 |
| Front wing mean chord [m] | 0.5 |
| Rear wing mean chord [m] | 0.75 |
| Wing sweep [deg] | 0 |
| Performance | |
| Cruise speed [kts] | 130 |
| Total cruise power [kW] | 160 |
| Lift/Effective drag | 8 |
| Range [nm] | 60 |
| Rotors | |
| Number of synthetic wing rotors | 12 |
| Number of blades per rotor | 6 |
| Rotor diameter [m] | 1.6 |
| Disk loading [kg/m^2] | 82 |
| Inner rotor radius [m] | 0.3 |

TABLE 2-continued

| | |
|---|---:|
| Blade root chord [cm] | 12 |
| Blate tip chord [cm] | 6 |
| Blade root pitch [deg] | 13 |
| Blade tip pitch [deg] | 10 |
| Installed tilt angle in cruise [deg] | 10 |
| Tail propeller diameter[m] | 1.2 |
| Electric motor for rotors | |
| Peak power [kW] | 100 |
| Continuous power [kW] | 50 |
| Power in hover (sea level) [kW] | 43 |
| Power in cruise [kW] | 7 |
| Power in cruise (total rotors) [kW] | 84 |
| Cruise RPM | 600 |
| Hover RPM | 1800 |
| Electric motor for propeller | |
| Continuous power [kW] | 100 |
| Cruise RPM | 800 |
| Power in Cruise [kW] | 76 |

In some embodiments with dual rows of wing rotors, the rows of wing rotors may be separated, and include one or more wing elements between the rows. In some embodiments, there may be more than two rows of wing rotors.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An aerial vehicle adapted for vertical takeoff and horizontal flight using rotors to simulate traditional wing aerodynamics, said aerial vehicle comprising:
   a main vehicle body;
   a right side wing assembly, said right side wing assembly comprising:
      a plurality of right side wing rotors in a forward swept configuration along a single forward swept linear or curvilinear first span direction, wherein the spin axis of each of said right side wing rotors is tilted forward;
      a forward swept right side leading edge wing, said right side leading edge wing having a first end at said main vehicle body and moving outboard along the first span direction directly forward of the plurality of right side wing rotors;
      a forward swept right side trailing edge wing, said right side trailing edge wing having a first end at said main vehicle body and moving outboard along the first span direction directly rearward of the plurality of right side wing rotors;
      a plurality of right side span supports, said right side span supports coupled to said forward swept right side leading edge wing on a first end, and coupled to said forward swept right side trailing edge wing on a second end, wherein each of said plurality of right side wing rotors are mounted on one of said plurality of right side span supports; and
      a right side wing tip section, said right side wing tip section joining said right side leading edge wing to said right side trailing edge wing outboard of said plurality of said right side wing rotors; and
   a left side wing assembly, said left side simulated wing comprising:
      a plurality of left side wing rotors in a forward swept configuration along a single forward swept linear or curvilinear second span direction, wherein the spin axis of each of said left side wing rotors is tilted forward:
      a forward swept left side leading edge wing, said left side leading edge wing having a first end at said main vehicle body and moving outboard along the first span direction directly forward of the plurality of left side wing rotors;
      a forward swept left side trailing edge wing, said left side trailing edge wing having a first end at said main vehicle body and moving outboard along the second span direction directly rearward of the plurality of left side wing rotors;
      a plurality of left side span supports, said left side span supports coupled to said forward swept left side leading edge wing on a first end, and coupled to said forward swept left side trailing edge wing on a second end, wherein each of said plurality of left side wing rotors are mounted on one of said plurality of left side span supports; and
      a left side wing tip section, said left side wing tip section joining said left side leading edge wing to said left side trailing edge wing outboard of said plurality of said left side wing rotors.

2. The aerial vehicle of claim 1 wherein the spin axis of said right side wing rotors is tilted forward at an angle in the range of 8-12 degrees, and wherein the spin axis of said left side wing rotors is tilted forward at an angle in the range of 8-12 degrees.

3. The aerial vehicle of claim 2 wherein the tilt angle of said right side wing rotors and the tilt angle of said left side wing rotors are not adjustable.

4. The aerial vehicle of claim 3 wherein said aerial vehicle does not have controllable control surfaces.

5. The aerial vehicle of claim 4 wherein a most inboard rotor of said plurality of right side wing rotors in a forward swept configuration is rearward of the longitudinal center of said aerial vehicle and wherein a most outboard rotor of said plurality of right side wing rotors in a forward swept configuration is forward of the longitudinal center of said aerial vehicle.

6. The aerial vehicle of claim 3 wherein a most inboard rotor of said plurality of right side wing rotors in a forward swept configuration is rearward of the longitudinal center of said aerial vehicle and wherein a most outboard rotor of said plurality of right side wing rotors in a forward swept configuration is forward of the longitudinal center of said aerial vehicle.

7. The aerial vehicle of claim 2 wherein said aerial vehicle does not have controllable control surfaces.

8. The aerial vehicle of claim 2 wherein each wing rotor has a plurality of blades and an electric motor, said electric motor mounted central to the spin axis of the rotor, and wherein an inboard end of said blade relative to the spin axis is outboard of the motor.

9. The aerial vehicle of claim 2 wherein a most inboard rotor of said plurality of right side wing rotors in a forward swept configuration is rearward of the longitudinal center of said aerial vehicle and wherein a most outboard rotor of said plurality of right side wing rotors in a forward swept configuration is forward of the longitudinal center of said aerial vehicle.

10. The aerial vehicle of claim 1 wherein the spin axis of said right side wing rotors is tilted forward at an angle in the range of 5-15 degrees, and wherein the spin axis of said left side wing rotors is tilted forward at an angle in the range of 5-15 degrees.

11. The aerial vehicle of claim 10 wherein the tilt angle of said right side wing rotors and the tilt angle of said left side wing rotors are not adjustable.

12. The aerial vehicle of claim 11 wherein said aerial vehicle does not have controllable control surfaces.

13. The aerial vehicle of claim 12 wherein a most inboard rotor of said plurality of right side wing rotors in a forward swept configuration is rearward of the longitudinal center of said aerial vehicle and wherein a most outboard rotor of said plurality of right side wing rotors in a forward swept configuration is forward of the longitudinal center of said aerial vehicle.

14. The aerial vehicle of claim 11 wherein a most inboard rotor of said plurality of right side wing rotors in a forward swept configuration is rearward of the longitudinal center of said aerial vehicle and wherein a most outboard rotor of said plurality of right side wing rotors in a forward swept configuration is forward of the longitudinal center of said aerial vehicle.

15. The aerial vehicle of claim 10 wherein said aerial vehicle does not have controllable control surfaces.

16. The aerial vehicle of claim 10 wherein a most inboard rotor of said plurality of right side wing rotors in a forward swept configuration is rearward of the longitudinal center of said aerial vehicle and wherein a most outboard rotor of said plurality of right side wing rotors in a forward swept configuration is forward of the longitudinal center of said aerial vehicle.

17. The aerial vehicle of claim 1 wherein the spin axis of said right side wing rotors is tilted forward at an angle in the range of 5-20 degrees, and wherein the spin axis of said left side wing rotors is tilted forward at an angle in the range of 5-20 degrees.

18. The aerial vehicle of claim 17 wherein a most inboard rotor of said plurality of right side wing rotors in a forward swept configuration is rearward of the longitudinal center of said aerial vehicle and wherein a most outboard rotor of said plurality of right side wing rotors in a forward swept configuration is forward of the longitudinal center of said aerial vehicle.

19. The aerial vehicle of claim 1 wherein each wing rotor has a plurality of blades and an electric motor, said electric motor mounted central to the spin axis of the rotor, and wherein an inboard end of said blade relative to the spin axis is outboard of the motor.

20. The aerial vehicle of claim 1 wherein a most inboard rotor of said plurality of right side wing rotors in a forward swept configuration is rearward of the longitudinal center of said aerial vehicle and wherein a most outboard rotor of said plurality of right side wing rotors in a forward swept configuration is forward of the longitudinal center of said aerial vehicle.

\* \* \* \* \*